(12) United States Patent
Tsai

(10) Patent No.: US 8,419,261 B2
(45) Date of Patent: *Apr. 16, 2013

(54) LIGHT GUIDE APPARATUS OF BACKLIGHT MODULE

(75) Inventor: Chung-Lin Tsai, Taoyuan (TW)

(73) Assignee: Global Lighting Technologies Inc., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/172,875

(22) Filed: Jun. 30, 2011

(65) Prior Publication Data

US 2012/0163029 A1 Jun. 28, 2012

Related U.S. Application Data

(63) Continuation of application No. 12/464,104, filed on May 12, 2009, now Pat. No. 7,997,784.

(51) Int. Cl.
*F21V 7/04* (2006.01)

(52) U.S. Cl.
USPC .......................... 362/621; 362/602; 362/97.1

(58) Field of Classification Search .................. 362/602, 362/621, 559, 97.1
See application file for complete search history.

(56) References Cited

U.S. PATENT DOCUMENTS

2007/0230215 A1* 10/2007 Chang .......................... 362/613
2010/0067220 A1* 3/2010 Chiu et al. .................. 362/97.1

* cited by examiner

*Primary Examiner* — David V Bruce
(74) *Attorney, Agent, or Firm* — Jianq Chyun IP Office

(57) ABSTRACT

A light guide apparatus of a backlight module is provided. The light guide apparatus includes a light guide plate and a plurality of LEDs serving as light sources disposed at one lateral side of the light guide plate. The light guide plate includes a circuit configured thereon, and the light sources are welded on the circuit of the light guide plate.

20 Claims, 5 Drawing Sheets

LIGHT GUIDE APPARATUS OF BACKLIGHT MODULE

CROSS-REFERENCE TO RELATED APPLICATION

This application is a continuation application of and claims the priority benefit of a prior application Ser. No. 12/464,104, filed on May 12, 2009, now allowed. The entirety of the above-mentioned patent application is hereby incorporated by reference herein and made a part of this specification.

BACKGROUND OF THE INVENTION

1. Field of the Invention

The present invention relates to a light guide structure including a light guide plate and a light source, and being adapted for a backlight module.

2. The Prior Arts

Backlight modules are now widely used in many kinds of electronic products. For example, displays of notebook computers, mobile phones, and liquid crystal televisions do not emit light by themselves, and require backlight modules for providing light sources.

A typical backlight module includes a light guide plate and a light source. Light emitting diodes (LED) are often employed serving as light sources of backlight modules for those electronic products demanding a relatively thin thickness. With respect to such a backlight module, the LED light source is positioned at a lateral side of the light guide plate. The light guide plate has a first surface and a second surface opposite to the first surface. A reflective sheet is provided at the first surface, and a plurality of optical sheets including a diffusing sheet and a prism sheet are provided at the second surface. An outer frame is provided for framing all of the components. In operation, the LED light source emits a light, and the light is inputted into light guide plate from the lateral side of the light guide plate. A part of the light is reflected by the reflective sheet, and sequentially passes through the diffusing sheet and the prism sheet, and is then outputted therefrom.

When serving for a backlight module having a relatively small area, the light sources are usually provided at one lateral side of the light guide plate. However, when serving for a backlight module having a relatively large area, if the light sources are only provided at one side of the light guide plate, the light inputted into the light guide plate gradually attenuates while being transmitted to the other side of the light guide plate. This often causes a nonuniform illuminating condition of the light guide plate. As such, a large size light guide plate is often provided with light sources at both sides for solving the problem of the single side light sources.

FIG. 1 is a schematic diagram illustrating a conventional backlight module including a light guide plate and light sources assembled together. Referring to FIG. 1, no matter the light sources are provided to one side, two sides, or even more sides of the light guide plate 1, the conventional backlight module is generally configured by providing LEDs 2 onto a circuit board 3, and then assembling the LEDs 2 and the circuit board together to the lateral side(s) of the light guide plate 1. Accordingly, in fabricating such a backlight module, the LEDs 2 must be previously welded to the circuit board 3. Then, the circuit board 3, together with the LEDs 2 welded thereon, is secured to the light guide plate 3. As such, the process of the fabrication is relatively complex, and needs a high fabrication cost.

SUMMARY OF THE INVENTION

A primary objective of the present invention is to provide a solution to the problem of the conventional backlight module, in which the fabrication process of providing the LEDs serving as light sources to the light guide plate is complex and costly.

According to the present invention, the backlight module includes a plurality of LEDs, a circuit, and a light guide plate. The circuit is adapted for controlling the light source of the backlight module and is directly configured on the light guide plate, and then the LEDs are directly welded to circuit contacts of the circuit that are distributed at one side of the light guide plate. In such a way, the process of the assembling the LEDs and the light guide plate is simplified.

According to an embodiment of the present invention, a circuit for controlling on/off state or light emitting sequence of the backlight module is configured on light guide plate. Then, the light guide plate is further provided with contacts at one side, two sides, or more sides of the light guide plate for connecting with the circuit. Then, LEDs having electrical contacts are fixed to the light guide plate by directly welding the electrical contacts of the LEDs to the contacts of the light guide plate, respectively.

According to another embodiment of the present invention, the light guide plate is configured with at least one recess at a lateral side for providing a light source. The contacts of the circuit are arranged at both sides of the recess or even inside the recess, and the LED is also received inside the recess. The electrical contacts of the LED are then welded to the contacts of the circuit. In such a way, the backlight module can achieve a further minimized size.

According to still another embodiment of the present invention, the light guide plate is configured with at least one hole inside the light guide plate at a lateral side for providing a light source. The contacts of the circuit are arranged at both sides of the hole or even inside the hole, and the LED is also received inside the hole. The electrical contacts of the LED are then welded to the contacts of the circuit.

BRIEF DESCRIPTION OF THE DRAWINGS

The present invention will be apparent to those skilled in the art by reading the following detailed description of a preferred embodiment thereof, with reference to the attached drawings.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
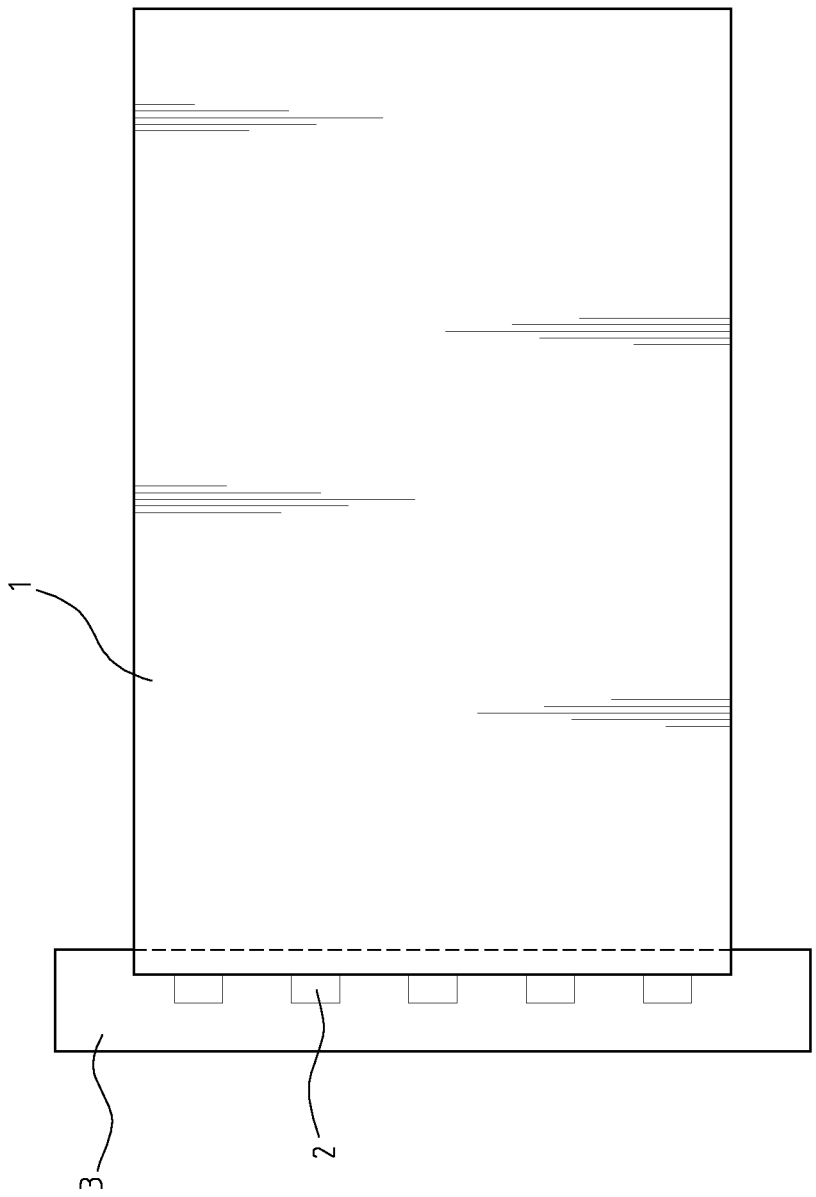
FIG. 1 is a schematic diagram illustrating a conventional backlight module including a light guide plate and light sources assembled together.
Figure 2:
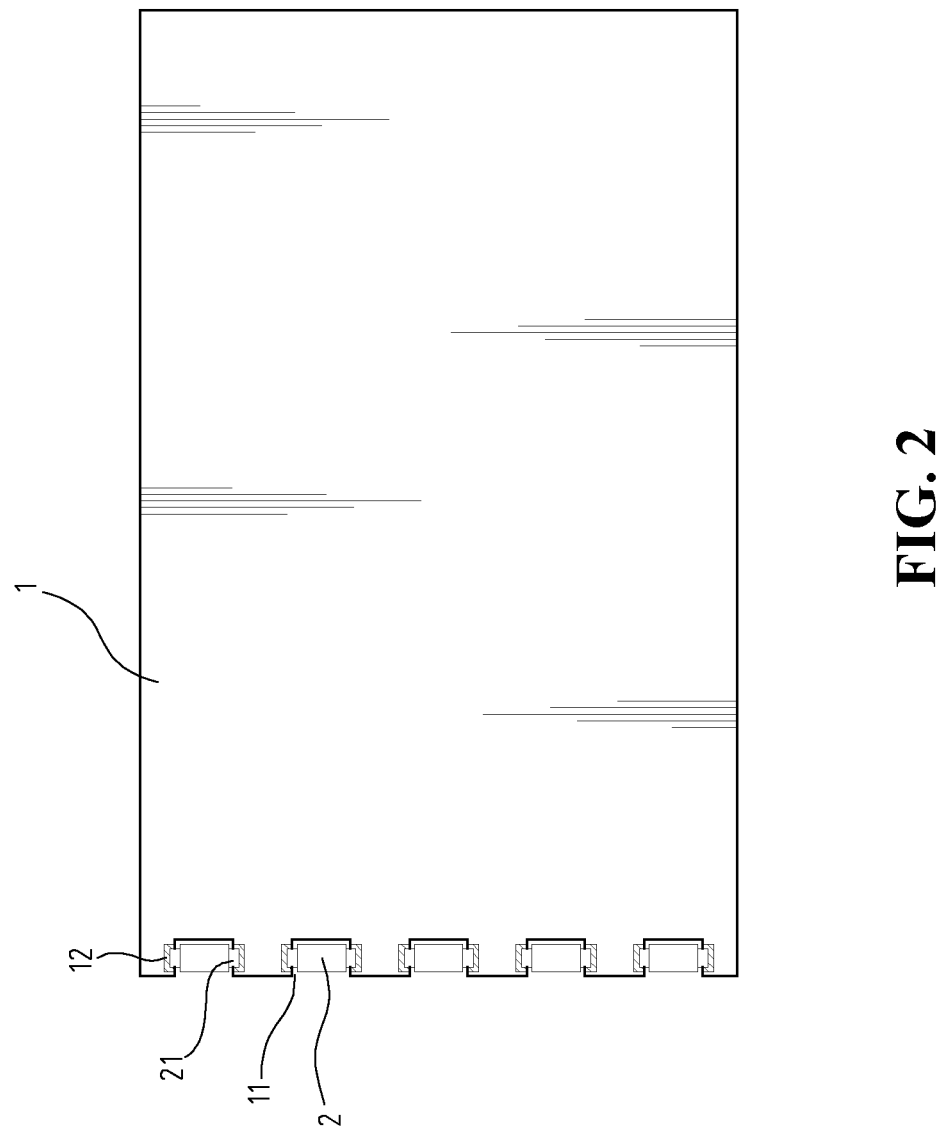
FIG. 2 is a schematic view showing that the LEDs are directly welded to one lateral side of a light guide plate according to an embodiment of the present invention.
Figure 3:
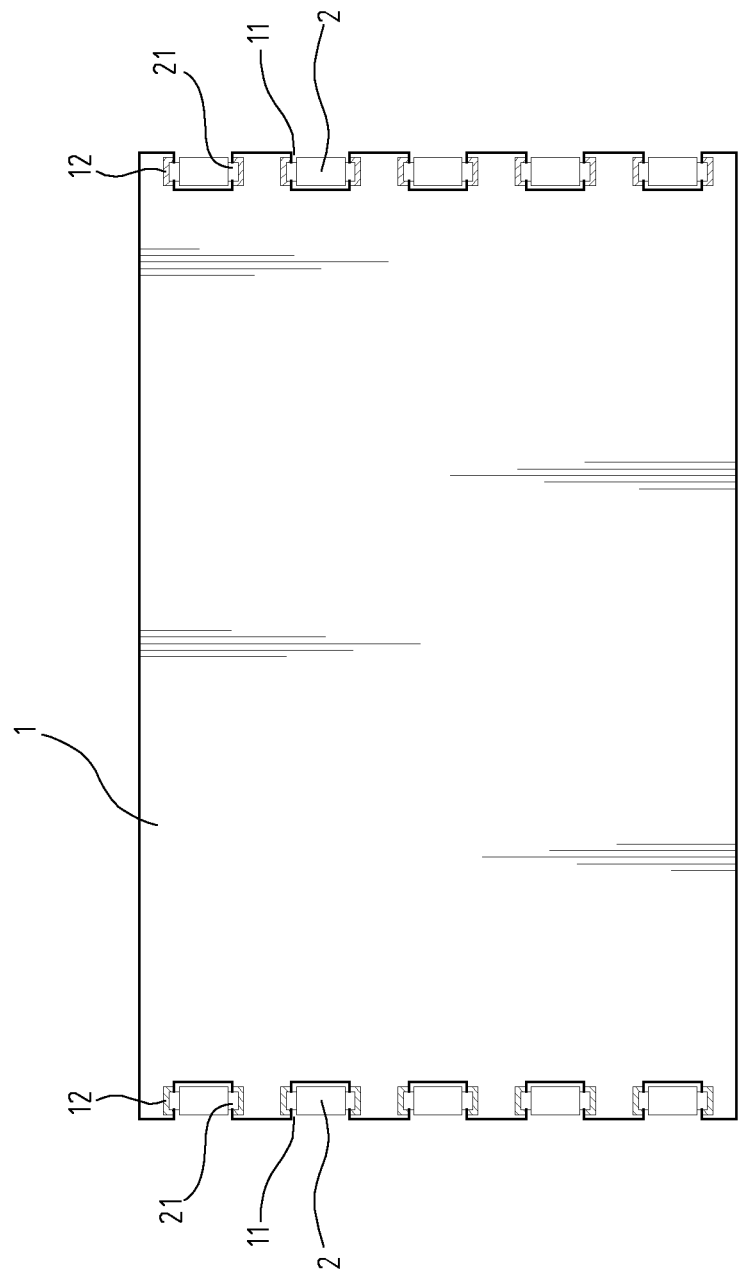
FIG. 3 is a schematic view showing that the LEDs are directly welded to two lateral sides of the light guide plate according to an embodiment of the present invention.

FIG. 2 is a schematic view showing that the LEDs are directly welded to one lateral side of a light guide plate according to an embodiment of the present invention. Referring to FIG. 2, the present invention provides a light guide apparatus of a backlight module. According to an embodiment of the present invention, the light guide apparatus includes a light guide plate 1, and a plurality of LEDs 2 provided at least one lateral side of the light guide plate 1. The light guide plate 1 includes a plurality of recesses 11 configured at one lateral side of the light guide plate. Each of the recesses 11 includes two circuit contacts 12 distributed at two sides of the recess 11. The light guide plate 1 further includes a circuit for controlling an on/off state and a light emitting sequence of the LEDs 2 distributed thereon. Specifically, the LEDs 2 are respectively disposed on supporters 21. Each of the supporters 21 includes two electrical contacts at both sides of the supporter 21. The electrical contacts of the supporters 21 are then directly welded to the circuit contacts 12. According to an aspect of the embodiment, when the light guide plate 1 has a relatively large area, for obtaining sufficient incident light, the light guide apparatus can be modified as shown in FIG. 3. FIG. 3 is a schematic view showing that the LEDs are directly welded to two lateral sides of the light guide plate according to an embodiment of the present invention. As shown in FIG. 3, the LEDs 2 are provided at two opposite lateral sides of the light guide plate 1. In other embodiments, the LEDs 2 can be provided at every lateral side of the light guide plate 1 for inputting more light into the light guide plate 1.

Figure 4:
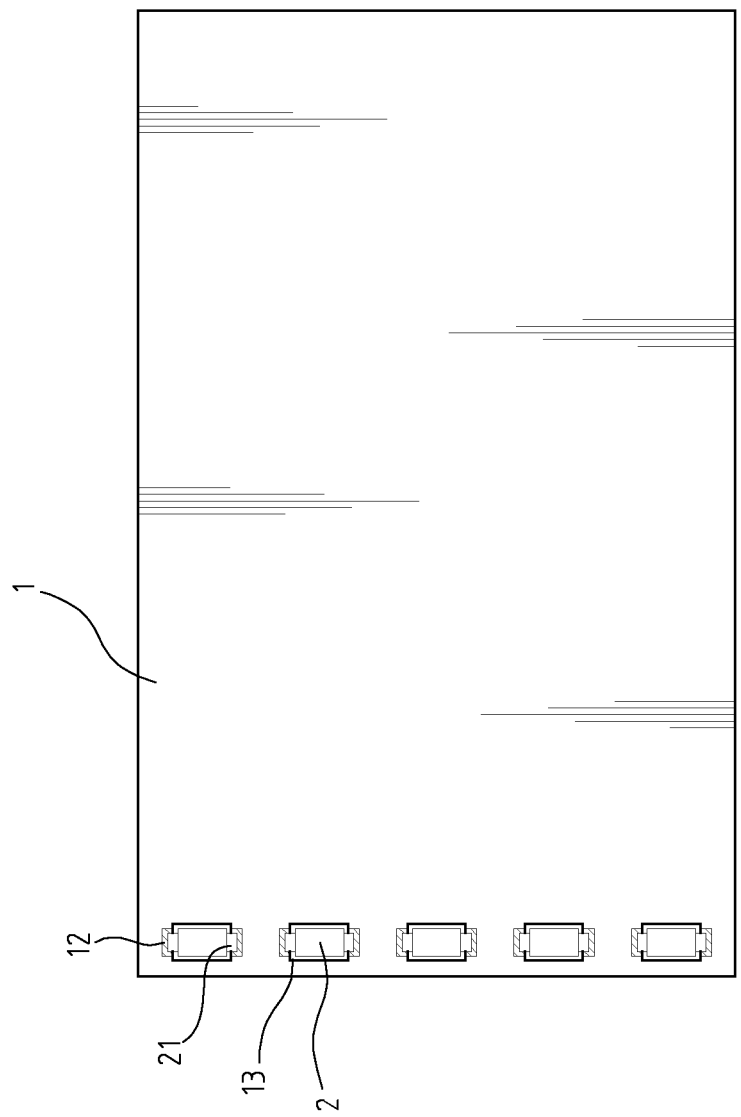
FIG. 4 is a schematic view showing the light guide plate including a plurality of holes at one side of the light guide plate and LEDs directly welded in the holes, according to an embodiment of the present invention.

FIG. 4 is a schematic view showing the light guide plate including a plurality of holes at one side of the light guide plate and LEDs directly welded in the holes, according to an embodiment of the present invention. Referring to FIG. 4, a plurality of holes 13 are configured inside the light guide plate 1 and adjacent to a lateral side of the light guide plate 1. Each of the holes 13 is provided with circuit contacts 12 at both sides of the hole 13 on the light guide plate 1. The electrical contacts of each of the supporters 21 are then welded to the circuit contact 12, so as to secure the LEDs 2 inside the holes 13. The holes 13 can be distributed inside the light guide plate 1 adjacent to one lateral side of the light guide plate 1, and can also be alternatively distributed separately adjacent to two opposite lateral sides or more lateral sides of the light guide plate 1.

Figure 5:
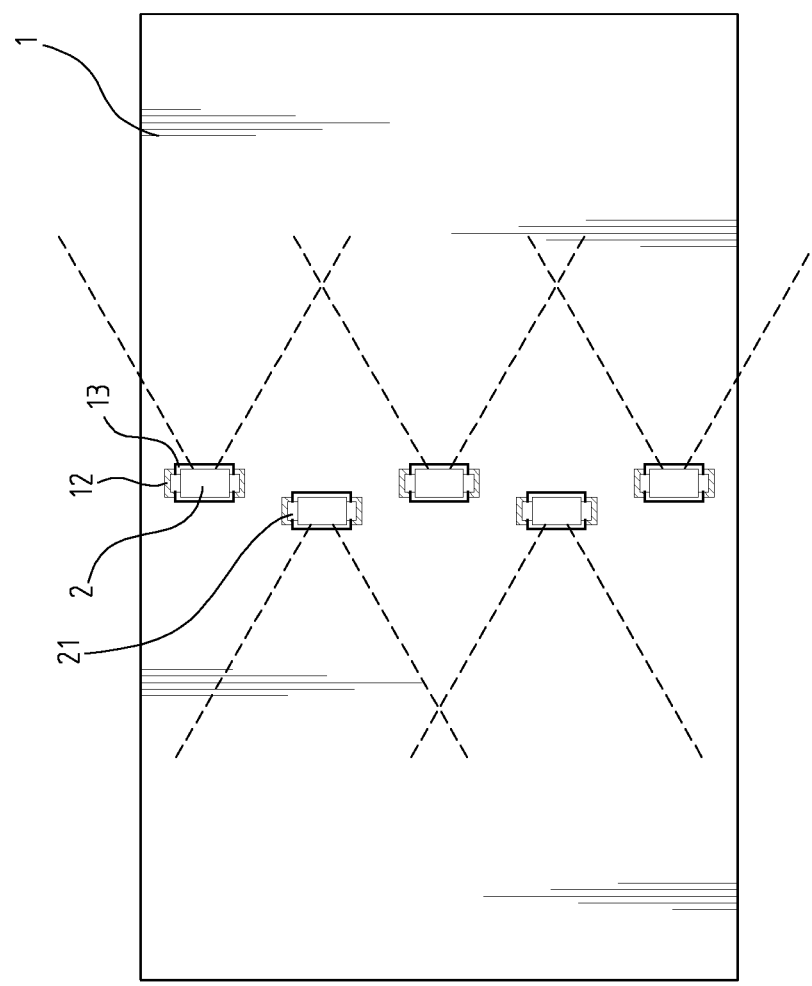
FIG. 5 is a schematic view showing the light guide plate including a plurality of holes at a center area of the light guide plate and LEDs directly welded in the holes, according to an embodiment of the present invention.

FIG. 5 is a schematic view showing the light guide plate including a plurality of holes at a center area of the light guide plate and LEDs directly welded in the holes, according to an embodiment of the present invention. Referring to FIG. 5, the holes 13 are configured at the center area of the light guide plate 1. Each of the holes 13 is provided with circuit contacts 12 at both sides of the hole 13 on the light guide plate 1. The electrical contacts of each of the supporters 21 are then welded to the circuit contact 12, so as to secure the LEDs 2 inside the holes 13. Preferably, two neighboring LEDs 2 are positioned in opposite directions for emitting lights toward opposite directions in the light guide plate 1, respectively. In such a way, the light guide plate 1 can be uniformly illuminated by the LEDs 2.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A light guide apparatus for a backlight module, comprising:
   a light guide plate configured with a recessed compartment and a circuit contact near the recessed compartment; and
   a light source disposed at the recessed compartment and electrically connected to the circuit contact.

2. The light guide apparatus as claimed in claim 1, wherein the recessed compartment is a recess.

3. The light guide apparatus as claimed in claim 1, wherein the recessed compartment is a hole.

4. The light guide apparatus as claimed in claim 1, wherein the recessed compartment is disposed at a lateral side of the light guide plate.

5. The light guide apparatus as claimed in claim 1, wherein the recessed compartment is disposed adjacent to a lateral side of the light guide plate.

6. The light guide apparatus as claimed in claim 1, wherein the recessed compartment is disposed near the center area of the light guide plate.

7. The light guide apparatus as claimed in claim 6, wherein the light source emits lights toward the lateral side of the light guide plate.

8. The light guide apparatus as claimed in claim 1, further comprising a supporter on which the light source is disposed.

9. The light guide apparatus as claimed in claim 8, wherein the supporter is configured with an electrical contact connected to the circuit contact by welding.

10. The light guide apparatus as claimed in claim 1, further comprising a circuit configured on the light guide plate whereas the circuit contact is a part of the circuit.

11. A light guide apparatus for a backlight module, comprising:
    a light guide plate configured with a plurality of recessed compartments and a plurality of circuit contacts near the recessed compartments, respectively; and
    a plurality of light sources disposed at the plurality of recessed compartments and electrically connected to the plurality of circuit contacts, respectively.

12. The light guide apparatus as claimed in claim 11, wherein the plurality of recessed compartments are recesses.

13. The light guide apparatus as claimed in claim 11, wherein the plurality of recessed compartments are holes.

14. The light guide apparatus as claimed in claim 11, wherein the plurality of recessed compartments are disposed at the lateral side of the light guide plate.

15. The light guide apparatus as claimed in claim 11, wherein the plurality of recessed compartments are disposed adjacent to the lateral side of the light guide plate.

16. The light guide apparatus as claimed in claim 11, wherein the plurality of recessed compartments are disposed near the center area of the light guide plate.

17. The light guide apparatus as claimed in claim 16, wherein the plurality of light sources emit lights toward the lateral side of the light guide plate.

18. The light guide apparatus as claimed in claim 11, further comprising a plurality of supporters on which the plurality of light sources are disposed, respectively.

19. The light guide apparatus as claimed in claim 18, wherein each of the plurality of supporters is configured with electrical contacts connected to the corresponding ones of the plurality of circuit contacts by welding, respectively.

20. The light guide apparatus as claimed in claim 11, further comprising a circuit configured on the light guide plate whereas the plurality of circuit contacts is a part of the circuit.

* * * * *